E. T. WALSH.
AUTOMATIC MEANS FOR SETTING TRAIN BRAKES.
APPLICATION FILED AUG. 20, 1917.
1,261,875. Patented Apr. 9, 1918.
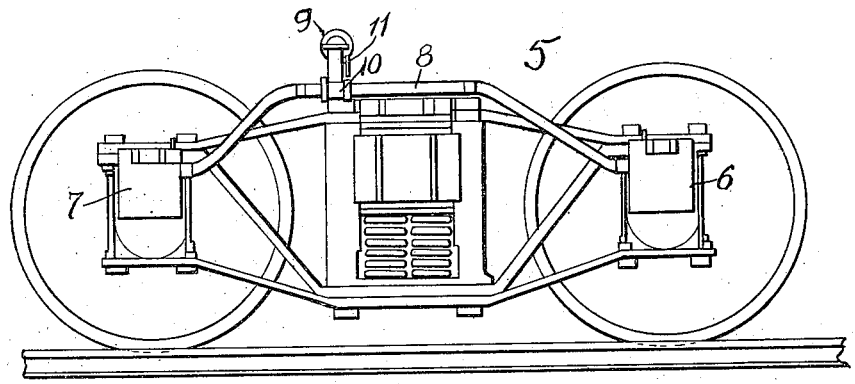
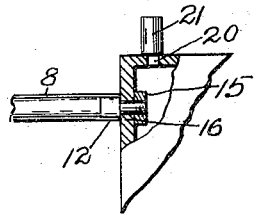
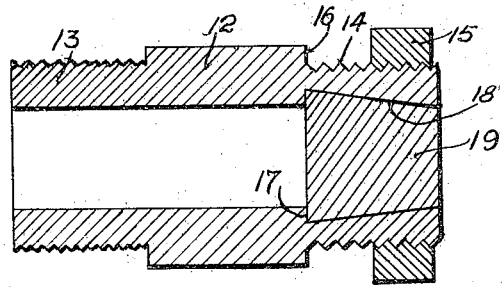
INVENTOR
EDWARD T. WALSH.
Joseph J. O'Brien
ATTORNEY

UNITED STATES PATENT OFFICE.

EDWARD T. WALSH, OF LYONS, NEW YORK.

AUTOMATIC MEANS FOR SETTING TRAIN-BRAKES.

1,261,875. Specification of Letters Patent. Patented Apr. 9, 1918.

Application filed August 20, 1917. Serial No. 187,138.

*To all whom it may concern:*

Be it known that I, EDWARD T. WALSH, a citizen of the United States of America, and a resident of the town of Lyons, in the county of Wayne and State of New York, have invented certain new and useful Improvements in Automatic Means for Setting Train-Brakes, of which the following is a full, clear, and exact description.

This invention relates to improvements in means for automatically setting the brakes of a train when one of the axle boxes becomes overheated, and consists in a special connection between the air line and the axle box, whereby this connection will be opened at the moment an excess temperature is generated in the axle box, so as to permit the air from the air line to exhaust through the axle box, and by this lowering of the pressure in the air line to cause the brakes to set.

Another object of the invention is the provision of signaling means which will be actuated by the flow of air through the axle box at the moment the air line is opened to set the brakes, so that the train crew will be notified and the particular axle box at fault may be quickly located.

With the above and other objects in view the invention consists of certain new and useful combinations, constructions and arrangements of parts, clearly described in the following specification and fully illustrated in the accompanying drawings, in which:—

Figure 1 is a side view showing my invention applied to a car truck.

Fig. 2 is a detail sectional view showing the connection of the blow out device with the axle box and the connection of the signal therewith.

Fig. 3 is a longitudinal sectional view of the blow out device.

Referring to the accompanying drawings illustrating the practical embodiment of the invention 5 designates a standard car truck, which includes the axle boxes 6 and 7.

An air conduit 8 is connected with each axle box, and these conduits have connection with the main air line 9 at 10. A manually operated valve 11 is provided for cutting off the connection between the conduits 8 and the main line 9.

The connection of each of the air conduits 8 with each axle box is by means of a special blow out connection which constitutes part of my present invention. This blow out connection consists of a union or pipe fitting 12, which has a nipple 13 on one end to receive the conduit 8 and screw threads 14 on the other end to receive the nut 15. A shoulder 16 is formed on the union or fitting 12 to engage the outside face of the axle box, as indicated in Fig. 2, and the nut 15 is threaded tight on the inner end of said fitting 12 to bear against the inner side of the axle box, whereby said fitting or union is positively clamped in position on said axle box; said axle box being formed with an opening through its wall to receive the inner end of the union or fitting.

The union or fitting 12 is formed with an internal shoulder 17 and a wall 18 which converges from said shoulder 17 toward the inner open end of the union or fitting. In this locking space a plug of alloy or low melting metal 19 is disposed, which is locked against movement in one direction by the shoulder 17 and against movement in the other direction by the converging wall 18.

When the axle box becomes overheated the temperature of the metal insert 19 will be raised to its melting point, so that the metal will become fluid and the air pressure behind the insert or plug will act to force the molten metal into the axle box, thus opening the air line and reducing its pressure, so that the brakes will be automatically set.

In order to prevent the axle box from acting as a closure for the opened air line I provide a vent 20 in said axle box through which the air may freely escape to atmosphere. When the air rushes through this vent it acts upon an air whistle or signal 21, which may be of any suitable design, so that a signaling noise is created by the escape of the air from the air line. By giving each whistle or signal a distinct tone the location of the faulty axle box may be more quickly determined. The distance of the actuated signal from the rear car may be determined also by the nature of the transmitted sound.

My invention will in no way complicate the normal working of the air brakes, and can be applied with little expense and labor to a train. It will materially reduce the losses due to breakdowns, caused by running on axle boxes rendered defective by burning out.

Having described my invention I claim and desire to secure by Letters Patent:—

1. An automatically operated brake setting means for railroad trains, consisting of a conduit having connection at one end with the air line and a connection between said conduit and an axle box consisting of a union having a metal insert in its bore of low melting point and locked against longitudinal displacement in either direction in said bore.

2. An automatic brake setting means consisting of an axle box having an opening in its wall, a conduit having connection at one end with the main air line, a union connecting said conduit with the opening in the axle box to permit the air from said conduit to flow into the axle box, and a plug inserted in said union to prevent the normal flow of air into said axle box and interlocked to said union against longitudinal movement in either direction.

3. An automatic brake setting means consisting of an axle box having an opening and a vent therein, a union connected with the opening, a signal connected with the vent and adapted to be actuated by the passage of air under pressure through the vent, a meltable plug in the union to prevent air flow therethrough, a conduit connected with the union, and a connection between the main air line and the conduit.

Signed at Lyons, Wayne county, New York by me.

EDWARD T. WALSH.

Copies of this patent may be obtained for five cents each, by addressing the "Commissioner of Patents, Washington, D. C."